United States Patent [19]

Studtmann et al.

[11] Patent Number: 5,110,087
[45] Date of Patent: May 5, 1992

[54] VARIABLE FORCE SOLENOID HYDRAULIC CONTROL VALVE

[75] Inventors: George H. Studtmann, Mount Prospect; James R. Ward, DeKalb; Terry L. Forbes, Dixon, all of Ill.

[73] Assignee: Borg-Warner Automotive Electronic & Mechanical Systems Corporation, Sterling Heights, Mich.

[21] Appl. No.: 718,944

[22] Filed: Jun. 21, 1991

Related U.S. Application Data

[63] Continuation-in-part of Ser. No. 543,162, Jun. 25, 1990, abandoned.

[51] Int. Cl.$^5$ ............................................. F16K 31/06
[52] U.S. Cl. ............................ 251/129.16; 251/129.18; 335/279; 335/237
[58] Field of Search ................... 251/129.16, 129.18; 335/279, 237

[56] References Cited

U.S. PATENT DOCUMENTS

| | | |
|---|---|---|
| 850,738 | 4/1907 | Dempster . |
| 1,053,340 | 2/1913 | Ziegler . |
| 2,169,683 | 8/1939 | Dunham et al. . |
| 2,267,515 | 12/1941 | Wilcox . |
| 2,840,769 | 6/1958 | Currie . |
| 2,860,850 | 11/1958 | Rhodes et al. . |
| 2,947,284 | 8/1960 | Nicholson . |
| 3,136,220 | 6/1964 | Kamm . |
| 3,185,779 | 5/1965 | Sawyer . |
| 3,219,095 | 11/1965 | Nilsson . |
| 3,368,791 | 2/1968 | Wells ..................... 251/129.16 X |
| 3,429,340 | 2/1969 | Opel et al. . |
| 3,433,256 | 3/1969 | Stillhard et al. . |
| 3,498,330 | 3/1970 | Paige . |
| 3,521,854 | 7/1970 | Leiber et al. . |
| 3,529,620 | 9/1970 | Leiber . |
| 3,534,770 | 10/1970 | Kowalski . |
| 3,545,472 | 12/1970 | Franz . |
| 3,586,237 | 6/1971 | Knobel . |
| 3,628,767 | 12/1971 | Lombard . |
| 3,688,495 | 9/1972 | Fehler et al. . |
| 3,817,488 | 6/1974 | Mack . |
| 3,861,643 | 1/1975 | Moffatt . |
| 3,861,644 | 1/1975 | Knape . |
| 3,873,060 | 3/1975 | Espenschied et al. . |
| 3,961,644 | 6/1976 | Eckert . |
| 3,982,554 | 9/1976 | Saito et al. . |
| 4,005,733 | 2/1977 | Riddel . |
| 4,120,214 | 10/1978 | Toda et al. . |
| 4,196,751 | 5/1980 | Fischer et al. . |
| 4,251,052 | 2/1981 | Hertfelder et al. . |
| 4,258,749 | 3/1981 | Mayer . |
| 4,285,603 | 8/1981 | Bernardis et al. . |
| 4,299,374 | 11/1981 | Yamanaka . |
| 4,304,391 | 12/1981 | Yamaguchi . |
| 4,337,794 | 7/1982 | Yamanaka et al. . |

(List continued on next page.)

FOREIGN PATENT DOCUMENTS

| | | |
|---|---|---|
| 1285270 | 4/1966 | Fed. Rep. of Germany . |
| 1941553 | 7/1966 | Fed. Rep. of Germany . |
| 1806040 | 10/1968 | Fed. Rep. of Germany . |
| 1179719 | 1/1970 | United Kingdom . |
| 2064720 | 6/1981 | United Kingdom . |

OTHER PUBLICATIONS

Endre A. Mayer SAE Technical Paper Series 810464, "Electro-Pneumatic Control Valve for EGR/ATC Actuation", Feb. 23, 1981.

C. Fox, B. Blohm, "EFC Electronic Flow Controller Differential Pressure Regulator", Sep. 1984.

*Primary Examiner*—Arnold Rosenthal
*Attorney, Agent, or Firm*—Willian, Brinks, Olds et al.

[57] ABSTRACT

An improved electrically actuated solenoid is used to regulate the function of a hydraulic flow control valve. The solenoid directs a control valve to generate a predetermined output pressure as a function of the solenoid input current. The working air gap surface area is increased by locating it at a greater circumferential radius than the pole piece to increase the air gap permeance, thereby increasing the output force obtainable from a solenoid of relatively small physical dimensions and low cost.

10 Claims, 2 Drawing Sheets

U.S. PATENT DOCUMENTS

| | | |
|---|---|---|
| 4,386,626 | 6/1983 | Hehl . |
| 4,419,642 | 12/1983 | Kramer et al. . |
| 4,522,371 | 6/1985 | Fox et al. . |
| 4,524,948 | 6/1985 | Hall . |
| 4,534,375 | 8/1985 | Fox . |
| 4,567,910 | 2/1986 | Slavin et al. . |
| 4,601,277 | 7/1986 | Cook . |
| 4,715,396 | 12/1987 | Fox . |
| 4,729,397 | 3/1988 | Bruss . |
| 4,846,439 | 7/1989 | Suzuki . |
| 4,875,499 | 10/1989 | Fox . |
| 4,967,781 | 11/1990 | Baron . |
| 4,971,116 | 11/1990 | Suzuki et al. ............ 251/129.16 X |

VARIABLE FORCE SOLENOID HYDRAULIC CONTROL VALVE

BACKGROUND OF THE INVENTION

This application is a continuation-in-part application of U.S. patent application Ser. No. 07/543,162, filed on June 25, 1990, and now abandoned for George H. Studtmann, James R. Ward, and Terry L. Forbes, now abandoned.

FIELD OF THE INVENTION

This invention relates to a solenoid designed to achieve a substantially constant output force over the operative range of solenoid armature axial positions and a substantially linear output force-current relationship. More particularly, the present invention relates to a variable force solenoid hydraulic control valve assembly having an improved armature geometry maximizing the surface area of a primary radial working gap radiating outwardly from a solenoid core to the armature and providing a supplementary secondary axial working gap between substantially flat surfaces. A hydraulic pressure force acting in combination with the electromagnetic force generated by magnetic flux traversing the working gaps at a given input current balances a solenoid return spring at various armature positions to produce a controlled pressure output with a minimal physical solenoid volume.

DESCRIPTION OF THE PRIOR ART

Variable force solenoids are useful in a number of applications requiring predictable output forces at assigned input currents independent of the displacement or stroke of the solenoid armature Such solenoids are commonly utilized in motor vehicle transmissions, where the solenoid actuates and deactuates hydraulic clutch packs in combination with a flow control valve. A solenoid having a generally predictable output force at a set input current regardless of the axial position of the armature and calibrated to obtain a controlled hydraulic pressure output related directly to the set input current has been found to effectively regulate the operation of hydraulically actuated devices.

The balancing effect is obtained from the resultant sum of three forces acting on the armature and attached control valve. A first force is the force exerted by the armature against a resilient return spring, and is determined by the spring rate of the return spring and the axial armature displacement A second force is defined by a relatively a large input hydraulic pressure acting on the surface area of a face of the control valve. A third force is defined by the electromagnetic force generated when an electric current is applied to the solenoid windings By properly calibrating the return spring rate, the effective area of the control valve face, and the effective range of electromagnetic forces, a given input current can be used to balance the first, second and third forces allowing the control valve to regulate an output pressure as a variable orifice.

The magnitude of this third electromagnetic force depends on the number of conductive windings, the applied current and the structure of the magnetic circuit. The structure of the magnetic circuit in turn depends on several factors, one of which is the permeance of existing air gaps to the passage of magnetic flux. In past solenoid configurations, the effective air gaps between the armature and the center pole piece were often radially proximate the solenoid center axis due to the space limitations inherent in motor vehicle applications. As this tended to reduce the effective area of the air gap surfaces, very close tolerances between the armature and the pole piece where required to obtain a permeance of appropriate magnitude. An example of such a solenoid configuration is U.S. Pat. No. 4,579,145, to Leiber et al. Allowing greater air gap tolerances as an alternative to the relatively high cost and low reliability of the necessarily close gap tolerances undesirably increases the overall size of the solenoid. Accordingly, a solenoid capable of producing a relatively large third electromagnetic force in a small, economically manufactured unit is desired.

It is therefore an object of this invention to provide a solenoid to generate a relatively large electromagnetic force.

It is also an object of this invention to obtain a relatively large electromagnetic force without appreciably increasing the solenoid size and thereby expand the useful applications of the solenoid.

It is an additional object of this invention to increase the solenoid air gaps permeance with an improved armature configuration to increase the effective air gap areas.

Further, it is an object of this invention to provide a hydraulic control solenoid valve that is operative according to a substantially linear relationship between a solenoid input current and a control valve output pressure independent of the initial armature position.

These and other objects of the invention may be determined by a review and understanding of the following disclosure.

SUMMARY OF THE INVENTION

The present invention comprises an electrically actuated solenoid for use in a hydraulic control valve. The invention provides the control valve with the ability to generate a selected output hydraulic pressure as a substantially linear function of the solenoid input current. An input pressure acts on the control valve and is regulated to provide a desired maximum controlled output hydraulic pressure independent of variations in the magnitude of the input hydraulic pressure. Accordingly, when the input hydraulic pressure exceeds a set maximum pressure corresponding to a certain force exerted by the control valve and armature assembly against a return spring, the excessive input hydraulic pressure is selectively bled to a low pressure hydraulic return circuit as the control valve operatively connected to the solenoid armature is caused to open.

When a lower controlled output pressure is desired, the solenoid is energized with an input current, creating a magnetic flux within a magnetic circuit substantially defined by portions of the solenoid and an armature. The magnetic flux produces the third electromagnetic force incrementally displacing the armature and control valve assembly and increasing the hydraulic pressure bled to the low pressure hydraulic return circuit and thereby reducing the controlled output hydraulic pressure The solenoid has an improved armature and pole piece configuration whereby the selectable third electromagnetic force depends solely on a substantially linear relationship with the solenoid input current, regardless of armature axial displacement relative to the pole piece. The improved configuration, increasing the air gap surface area and thereby increasing the air gap permeance by placing the air gaps at a position radially displaced from the solenoid center axis, favorably increases the third electromagnetic force capability of a solenoid of relatively small physical dimensions. The resulting improved electromagnetic force versus current characteristics make this improved solenoid suitable for a hydraulic control system.

Regardless of the initial displacement of the control valve and armature assembly, largely determined by the input hydraulic pressure upon initiation of the solenoid input current, predictable and repeatable controlled output hydraulic pressure is obtainable with in a small, relatively inexpensive unit.

Thus, the present invention provides an electromechanical device having a solenoid portion to provide the electromagnetic force and a fluid control portion to allow control of hydraulic fluid from an inlet to an outlet. The device includes a housing having a magnetic coil that is formed from an electrical winding.

A pole piece or center member having an axial length is placed within the center portion of the winding. One end of the pole piece extends beyond the electrical winding of the coil in the form of a flange. The flange extends outwardly from the center of the pole piece towards the outside of the device.

A magnetic armature is disposed within the housing and is allowed to move forward and away from the coil within the housing. The armature is formed in three portions, that is, a generally cylindrical center portion, a substantially planar intermediate portion, and an outside portion. The armature, pole piece and housing act to form a magnetic flux circuit for the electromagnetic flux generated by energization of the magnetic coil.

The structure and location of the armature with respect to the pole piece provides several of the novel features of the valve. The outside portion of the armature is formed with an axial length and is positioned radially outside the flange end of the pole piece to define a first radial variable working air gap GG between the armature outside portion and the pole piece. Axial movement of the armature outside portion during translation of the armature acts to vary the portion of the axial length of the outside portion that is within the above-mentioned magnetic flux path and thereby vary the axial length of the first radial variable working air gap GG.

The intermediate portion of the armature defines a substantially circular planar surface. The intermediate portion is axially displaceable from the flange end of the pole piece to define an axial variable working air gap FF. Translation of the armature acts to vary the air gap FF.

The outside portion of the armature has an outer circumferential surface that is positioned radially inside and spaced from the housing to define a second radial return air gap RR. Translation of the armature does not vary the radial gap RR.

The three air gaps in the magnetic flux circuit, which are provided by the structure of the device of the present invention, allow control of the armature position and a control of the fluid flow through the valve by a control of the amount of current sent to the electrical winding of the coil. Moreover, the structure of the device provides two variable working air gaps. Variation of the air gaps alters the reluctance of the magnetic flux circuit. Optimum control of the flux is also obtained by having the radial length of the flange portion of the pole piece substantially greater than the radial width of the armature outside portion. Similarly, the outside portion of the armature extends axially in two directions beyond the intermediate portion to provide a greater axial length for the radial gap RR. The coil may be energized by commonly known power sources such as DC that is controlled by a linear controller or DC that is pulse width modulated by a variety of known techniques. In the latter case the magnetic materials must be chosen to minimize losses due to eddy currents.

A seat member is also disposed within the pole piece. In the preferred embodiment, the seat member is located within the portion of the pole piece that is within the electrical winding. The location of the seat member is adjustable by the threaded connection with the pole piece.

A resilient spring member is positioned between the seat member and the armature center portion to provide a spring force opposite to the direction of the magnetic force on the armature. The spring member acts to urge the armature away from the seat member.

The armature also includes a centering mechanism for preventing substantial radial movement of the armature within the housing. In one embodiment, the centering means includes a diaphragm spring that extend radially from the armature and being is secured to the housing. In another embodiment, the centering means includes an armature stem member that is disposed within the center of the pole piece.

The device also includes valve means operatively connected to the armature to control fluid flow from an inlet to an outlet. A fluid conduit in operative communication with the fluid inlet and fluid outlet selectively allows fluid flow between the fluid inlet and the fluid outlet.

BRIEF DESCRIPTION OF THE INVENTION

Figure 1:
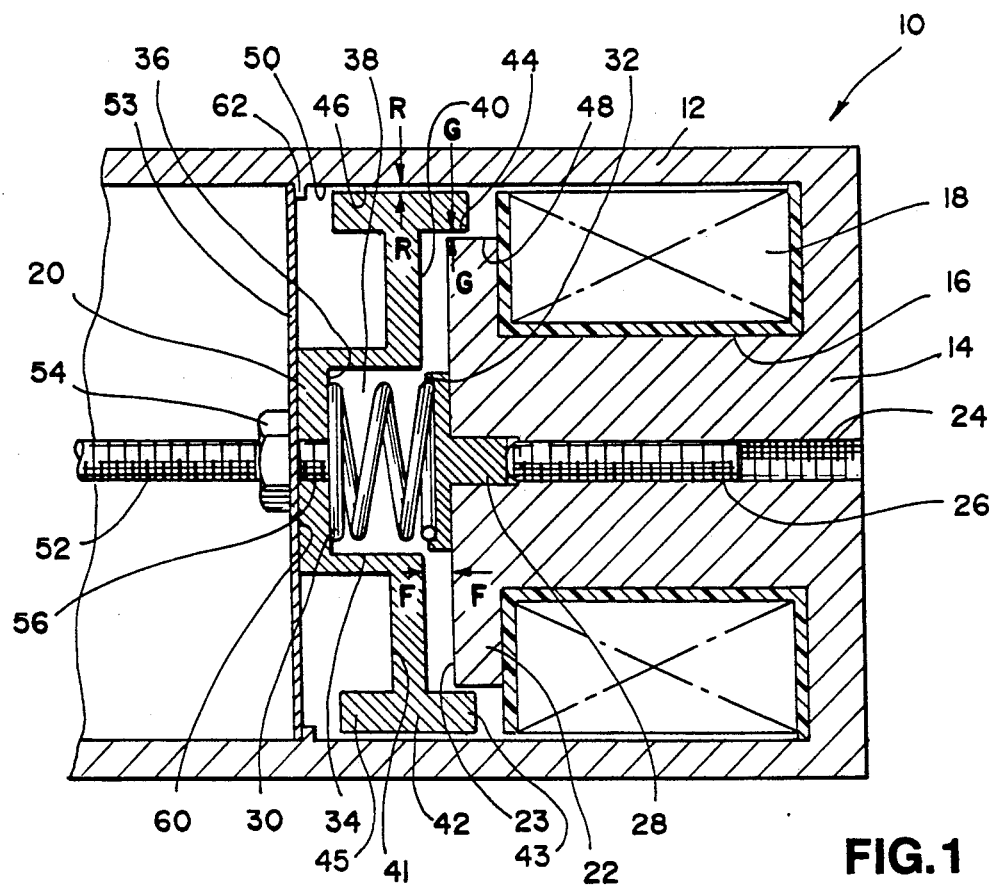
FIG. 1 is a cross-sectional view of a first embodiment along the longitudinal axis of the variable force solenoid, showing the improved solenoid armature and pole piece configuration according to the present invention.

It should be understood that the drawings are not necessarily to exact scale and that certain aspects of the embodiments are illustrated by graphic symbols, schematic representations and fragmentary views. It should also be understood that when referring to physical relationships of components by terms such as "upper", "lower", "upward", "downward", "vertical", "horizontal", "left", "right"or the like, such terms have reference solely to the orientation depicted in the drawings. Actual embodiments or installations thereof may differ.

While much mechanical detail, including other plan and section views of the particular embodiment depicting have been omitted, such detail is not per se part of the present invention and is considered well within the comprehension of those skilled in the art in the light of the present disclosure. It should also be understood, of course, that the invention is not limited to the particular embodiments illustrated.

DETAILED DESCRIPTION OF THE PREFERRED EMBODIMENTS

Referring to the drawings, where like or similar character references refer to like or similar features throughout the views, FIG. 1 shows one embodiment of a solenoid 10 located within a housing 12 preferentially constructed of a ferromagnetic material, such as iron. Located along the central axis of the housing 12 is a ferromagnetic pole piece 14. Within an annular cavity 16, located at an intermediate radial position between the housing 12 and the pole piece 14, is an electrical winding or conductive coil 18. The conductive coil 18, preferably constructed of copper, is connected to an electric current source (not shown) in the well known manner. When excited by an electric current, the coil 18 includes a magnetic flux substantially within a magnetic circuit defined by the housing 12, the pole piece 14 and at least a portion of an armature 20. The pole piece 14 extends beyond the coil 18, toward the armature 20, and is provided with a flange 22. A flange face 23 is formed by the flange 22 on the surface closest to the armature 20. The flange 22 secures the coil 18 and also forms magnetically operative surfaces of the pole piece 14, which will be discussed presently.

Extending through the axis of the pole piece 14 is a cylindrical cavity 24 allowing access from the exterior of the solenoid 10. The cylindrical cavity 24 is preferably tapped to form a threaded cylindrical channel, wherein a set screw 26 with mating threads is rotatably threaded and is preferentially equipped with means to apply torque. Rotation of the set screw 26 causes longitudinal displacement of the set screw 26 within the cylindrical cavity 24. A solenoid spring seat 28, positioned between a return spring 30 and one end of the set screw 26, can be selectively positioned along the longitudinal axis of the solenoid 10 to modify the slope of the substantially linear solenoid output force-input current relationship.

The solenoid spring seat 28, constructed of a non-ferromagnetic material having a relative permeance substantially that of unity, is held in position and urged against the set screw 26 by the compressive force exerted by the return spring 30 operatively coupled to the armature 20. A retaining edge 32 of the spring seat 28 prevents radial motion and misalignment of one end of the return spring 30. The spring 30 is initially compressed upon installation and remains compressed thereafter. The return spring 30 compression may be adjusted by means of the set screw 26 as noted above. An armature recess 34 formed at the hub of the armature 20 receives the opposite end of the return spring 30. The recess 34 defines a cylindrical cavity 38 and a circular bearing surface 36 through which the return spring 30 exerts a first spring force on the armature 20 in proportion to the compression of the return spring 30. The diameter of the cylindrical cavity 38 prevents radial motion and misalignment of the return spring 30 while allowing the armature 20 to approach the retaining lip 32 of the spring seat 28 without physical interference.

Figure 2:
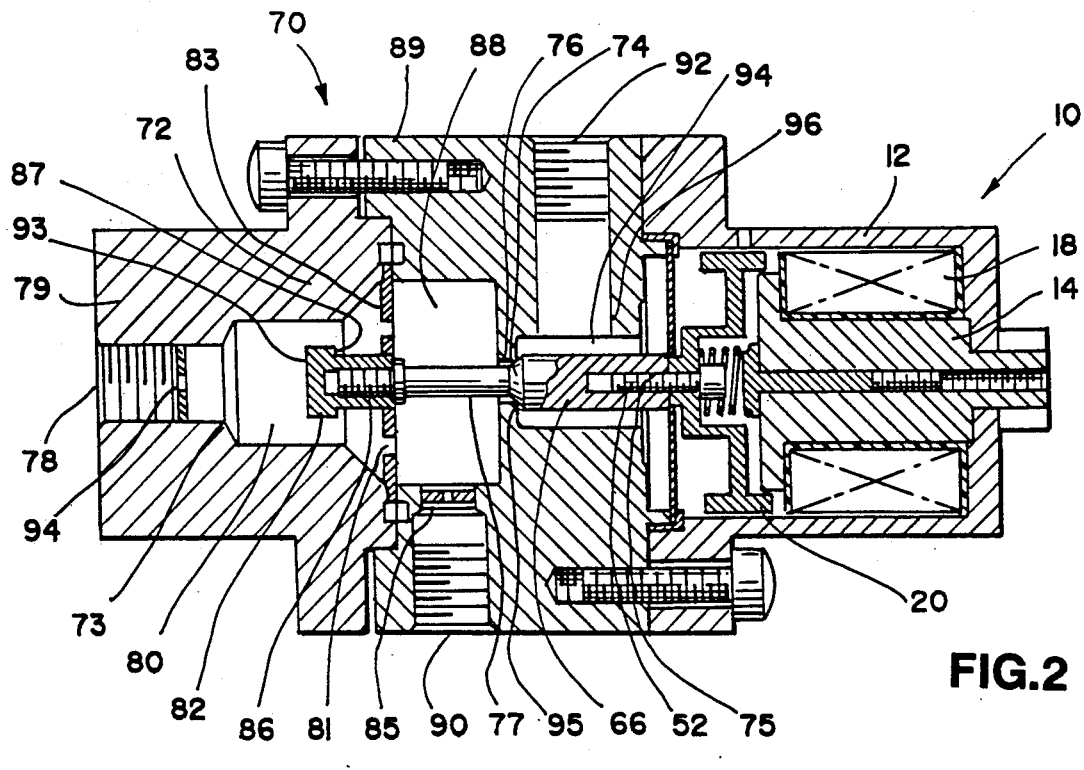
FIG. 2 is a cross-sectional view of a first embodiment along the longitudinal axis of the variable force solenoid of the present invention combined with a hydraulic control valve for use in a hydraulic circuit adapted to operate a hydraulically actuated device.

The armature 20, as shown in FIG. 2, is comprised of three portions. A center portion is between the recess 34 and holds the return spring 30. An intermediate portion extends from the recesses and is parallel to the flange face. An outer portion extends radially beyond the intermediate portion and is separated from the housing by a small gap.

The armature 20 is provided with a circular face 40 opposite the flange face 23 and separated by an axial air gap FF. An outer face 41 is opposite the face 40. An annular ring or rim 42 circumferentially encompasses the outer periphery of the armature 20 and extends longitudinally beyond both the circular face 40 and the outer face 41 to form lips 43, 45. The inner circumferential surface of the lip 43 defines an armature radial working gap surface 44. The gap surface 44 and a cooperating pole piece radial working gap surface 48 on the outer circumference of the flange 22 define a radial working gap GG. In the configurations evaluated to date, a radial working gap GG of approximately 0.015 inches has been found preferable. However, other configurations may indicate a larger or smaller radial working gap GG. An armature return gap surface 46 on the outer circumferential surface of the rim 42 likewise cooperates with a housing return gap surface 50 on the inner circumferential surface of the housing 12 to form a return gap RR. A return gap RR of approximately 0.015 inches has also been found preferable. The gap may vary with different designs.

The armature 20 remains coaxial with the solenoid 10 axis due to a diaphragm spring 53 attached to the armature 20 by means of a valve coupling pin 52 and a threaded retainer 54. The valve coupling pin 52 threadingly engages a tapped orifice 56 in the armature 20. The orifice 56 extends through the armature 20 from a flat surface 60 to the circular bearing surface 36. The flat base 60 is thus fixed against the diaphragm spring 53, which radially extends outwardly toward a rib 62 formed on the inner circumferential surface 50 of the housing 12 to prevent axial motion of the outer periphery of the diaphragm spring 53.

Applied to a flow control valve, the solenoid of the present invention may be seen in FIG. 2. The control valve assembly 70 includes the solenoid 10 and a valve assembly 72 located within the two housing members 79 and 89. The control valve assembly 70 includes one fluid inlet and two fluid outlets. A fluid inlet port 78 receives system hydraulic fluid at a hydraulic pressure generally exceeding 60 psig. The fluid then flows through a restriction orifice 94 (preferably sized in evaluated configurations to about 0.030 in.) and an inlet orifice 73 into a first control chamber 80. A controlled fluid outlet port 90 is in fluid communication with the first control chamber 80 through a second control chamber 88 and a controlled fluid outlet orifice 85. A bypass pressure outlet 92 is in fluid communication with a bypass chamber 94 via bypass orifice 96. The control chambers 80 and 88 and the bypass chamber 94 are in selective fluid communication via the valve assembly 72.

The valve assembly 72 includes a poppet valve 74 and a valve seat 95 selectively allowing fluid flow through a control orifice 76. The poppet valve 74 further includes a connecting member 66, having a tapped cylindrical cavity 75 threadingly connected to the valve coupling pin 52, as described above. Fixedly connected to the opposite end of the poppet valve 74 and further comprising the valve assembly 72 is a transfer pin 77 and a member 82. The member 82 defines a first circular face 93 and a small second annular face 87, which when exposed to hydraulic pressure form pressure bearing surfaces of unequal area to create the second hydraulic force operatively coupled to the armature 20. A tapped cylindrical cavity 86 in the member 82 threadingly receives a threaded end of the transfer pin 77.

The axis of the valve assembly 72 remains coaxial to the valve assembly 72 through a diaphragm spring 83 fixedly attached to the valve assembly 72 by the transfer pin 77 and member 82. The diaphragm spring 83 extends outward radially where its the outer periphery is secured between the two members 79 and 89 of the control valve assembly 70 to prevent longitudinal axial motion of the outer periphery of the diaphragm spring 83. The diaphragm spring 83 is further provided with apertures 81 positioned intermediate its center and periphery to provide continuous fluid communication between the first control chamber 80 and the second control chamber 88.

The resultant force obtained from the several forces acting on the solenoid armature 20 selectively regulates the operation of the control valve assembly 70, which operates essentially as a bypass valve. A hydraulic input pressure of at least 60 psig is supplied to the inlet port 78. Restriction orifice 94 retards large flow rates and communicates a pressure signal at relatively low flow rates into the first control chamber 80 and the second control chamber 88. The member 82 is thus exposed to the inlet pressure. The difference in surface area between the circular face 93 and the annular face 87 produces the second hydraulic force urging the member 82, the transfer pin 77, the poppet valve 74, the connecting member 66, the valve coupling pin 52 and the armature 20 slightly to the right to slightly open the valve assembly 72 by moving the poppet valve 74 away from the valve seat 95. The pressure signal into the first control chamber 80 and the second control chamber 88 then flows through the bypass chamber 94, the bypass orifice 96 and the bypass outlet port 92 to a low pressure return circuit as well as through the controlled outlet orifice 85 and the controlled outlet port 90 to the hydraulically actuated device. As the relatively low flow resistance favors the bypass outlet port 92, pressures above about 60 psig bleed through the valve assembly 72 until the pressure in the control chamber 80 is again restored to about 60 psig. Accordingly, a regulated maximum pressure consistently flowed to the hydraulically actuated device regardless of the magnitude of an input pressure above 60 psig.

The return spring 30, compressed by the armature 20 motion, produces the first spring force seeking to push the armature 20 away from the solenoid 10. If the inlet pressure falls below about 60 psig, the second hydraulic force decreases allowing the first spring force to overcome the second hydraulic force. The member 82, the transfer pin 77, the poppet valve 74, the connecting member 66, the valve coupling in 52 and the armature 20 are pushed toward the left. The valve assembly 72 is thus closed as the second hydraulic force is insufficient to move the poppet valve 74 away from the valve seat 95. In this position, the hydraulic fluid flows only into the first control chamber 80, the second control chamber 88, the controlled outlet orifice 85 and the controlled outlet port 90 to the hydraulically actuated device, such as a hydraulic clutch pack.

The third electromagnetic force emanates from the magnetic flux flowing through the solenoid 10 and the armature 20 to allow the valve assembly 72 to operate as a variable orifice and thereby selectively control the controlled outlet pressure between a desired lower hydraulic pressure and the maximum regulated pressure. To decrease the hydraulic pressure delivered by the controlled output port 90 (e.g., to decrease the pressure delivered to the hydraulically actuated device), an input current is applied to the coil 18. The input current, the magnitude thereof being proportional to the desired decrease in the controlled output pressure, induces a magnetic flux of a fixed magnitude substantially within the magnetic circuit defined by the pole piece 14, the housing 12, the armature 20, the radial working gap GG and the return gap RR.

The induction of the third electromagnetic force pulls the armature 20 to the right, compressing the return spring 30 until the additional first spring force is equal to the third electromagnetic force. Thus, the member 82, the transfer pin 77, the poppet valve 74, the connecting member 66, and the valve coupling pin 52 coupled to the armature 20 will be pulled to the right. The valve assembly 72 opens and fluid flow bleeds through the bypass chamber 94, the bypass orifice 96 and the bypass outlet port 92 to the low pressure return circuit. Thus, the pressure signal through the controlled outlet orifice 85 and the controlled outlet port 90 to the hydraulically actuated device can be reduced to a very low minimum value. (e.g., 2-3 psig). A lower minimum pressure in the control chambers 80 and 88 has been found to manifest hysteresis effects from the return spring 30 when the input current returns to zero. Accordingly, adjustment of the input current is effective to vary the position of the armature 20 and the attached valve assembly 72 to control the output pressure.

As noted earlier, the magnetic flux emanates from an electrical current applied to the conductive coil 18 to produce the third electromagnetic force. The third electromagnetic force thus attracts the armature 20 toward the pole piece 14 forming the center of the flux circuit coaxial to the solenoid 10.

The magnetic flux, acting over a unit area, is often expressed as the flux density. The flux density, acting through the various magnetic reluctances established by the configuration of the magnetic circuit, is limited essentially by the permeance of the air gaps GG and RR, here preferably held to about 0.015 in. and the gap FF and the permeance of the ferromagnetic elements. The magnitude of the flux density is thus controlled by the input current, the number of the coil 18 windings, the degree of saturation of the fixed ferromagnetic elements of the solenoid 10, and the permeance of the air gaps GG, FF and RR separating the armature from the solenoid 10 structures To obtain a linear relationship between the third electromagnetic force and the input current, the ferromagnetic portions of the magnetic circuit are designed to progressively magnetically saturate as the input current is increased. Thus, the magnetic flux is limited and the force can be made proportional to the input current rather than the square of the input current as would be the case if saturation did not occur.

As the armature 20 is displaced to the right, the effective surface area of the radial working gap GG increases linearly with the displacement. Correspondingly, the permeance of the radial working gap increases linearly with displacement, and the rate of change of permeance with respect to displacement is constant. If all of the driving ampere turns were absorbed across the working gap, then the force would be constant, since force is proportional to the square of the ampere turns multiplied by the spatial rate of change of permeance with respect to displacement. This relationship is well known to one skilled in the art. However, some of the NI is absorbed across the steel components and the return gap RR, causing the force to decrease somewhat as the armature moves to the right. This effect is analogous to the voltage regulation, or voltage drop, due to the internal impedance of a battery. As the load on the battery is increased, the voltage drop across the internal impedance increases and the output voltage decreases This decrease in force may be compensated for by a means described in a later section.

The independence of the magnitude of the third electromagnetic force from the initial position of the armature 20 is desired as the initial armature 20 position varies due to its hydraulic pressure regulating function in conjunction with the valve assembly 72. Thus, if the armature 20 is initially displaced to the right to bleed excessive pressure out of the control chambers 80 and 88, the third electromagnetic force will remain dependent only on the input current. The first spring force and the second hydraulic force, already at a state of relative equilibrium, will be augmented by the third electromagnetic force, which will in turn establish a new force balance by the additional compression of the return spring 30.

The solenoid air gaps GG and RR maintain an air gap of fixed width over the entire stroke of the armature 20 due to the concentric location of the armature 20 around the outer periphery of the pole piece 14. For the generally cylindrical shapes of the armature 20 and the pole piece 14, the area of the surfaces of the radial working gap GG and return gap RR are significantly increased by the relatively large outward radial location of the radial working gap GG and RR surfaces. The permeance of the radial working gap GG and return gap RR are greatly enhanced by these large gap areas. Very small air gaps, the method of choice to improve the permeance of the air gaps in past solenoid designs, typically require very close manufacturing tolerances (i.e., 0.007 in.). These very exacting tolerances, avoided by the present invention, tend to increase the cost of the device and contribute to binding from misalignment or improper clearances.

The present invention accordingly overcomes the need for small air gaps to enhance permeance by increasing the effective radii at which the radial working gap GG and return gap RR. The increased outward radial positions of the radial working gap GG and the return gap RR enable design tradeoffs between gap tolerance, physical size and force output to be made. For example, larger gaps may be used to obtain an equivalent force output in the same size as compared to a conventional design, or more force may be obtained with the same gap and physical size.

As the armature 20 moves to the right, as noted above, the permeance of the radial working gap GG increases (or its reluctance to magnetic flux flow decreases). At a given input current and a fixed amount of turns on the conductive coil 18, defining the magnetic potential of the circuit, proportionally more of the driving ampere-turns are dropped across the proportionally higher reluctances of the return gap RR and the ferromagnetic paths, particularly as the latter becomes increasingly saturated. This tends to decrease the third electromagnetic force produced across the radial working gap GG. To offset this decrease in the third electromagnetic force, a supplemental electromagnetic force acting across the axial air gap FF on the circular face 40 and the flange face 23 can be used. As the armature moves further to the right, the axial air gap FF is reduced, which tends to increase its permeance to the magnetic flux and increase the supplemental electromagnetic force. Indeed, the supplemental electromagnetic force varies as the square of the reciprocal of the gap FF.

An additional advantage of the solenoid armature 20 configuration according to the present invention is that the slope of the linear third electromagnetic force-stroke curve may be adjusted by varying the initial length of the axial working gap FF. Thus, a falling, constant, or rising third electromagnetic force-stroke curve achieves whatever third electromagnetic force requirements are needed within the solenoid 10.

To accommodate the magnetic flux crossing the working air gaps GG and FF, the return air gap RR must have a relatively high permeance, which is obtainable with either a relatively large surface area or a very small gap. Positioning the return gap RR at the outer circumference of the annular rim 42 substantially achieves the desired increased surface area. With this area increase, the likelihood of the return air gap RR limiting the magnetic flux flow across the working gaps GG and FF is minimized.

Figure 3:
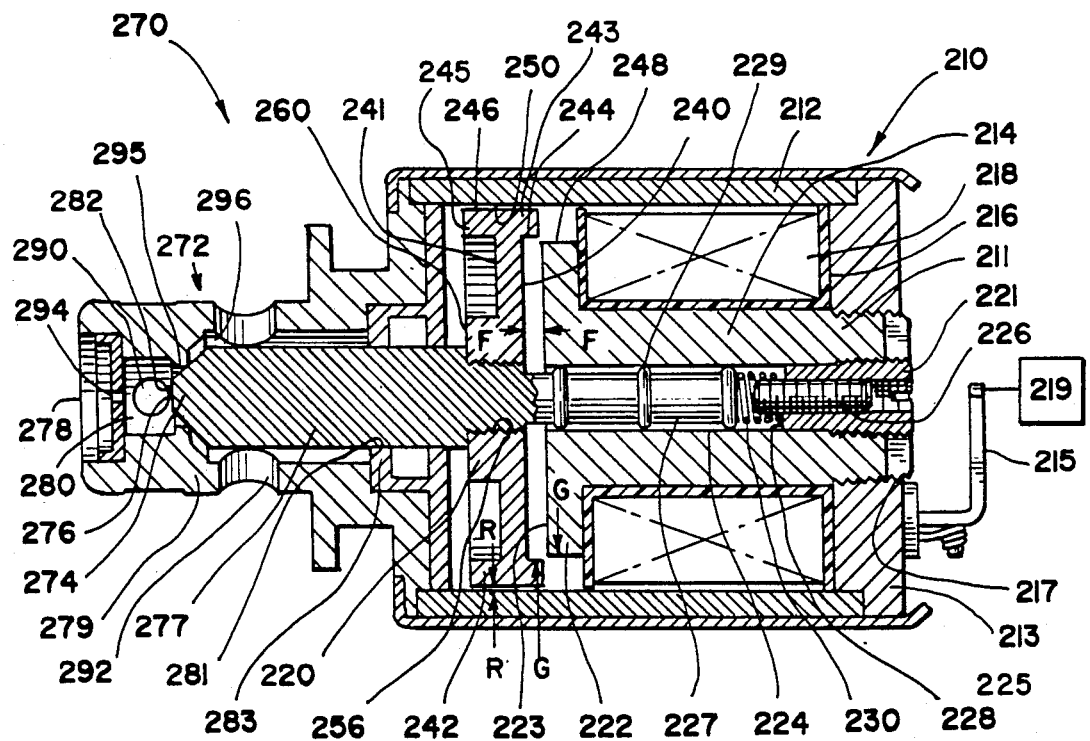
FIG. 3 is a cross-sectional view of a second embodiment along the longitudinal axis of the variable force solenoid of the present invention combined with a hydraulic control valve for use in a hydraulic circuit adapted to operate a hydraulically actuated device.

Referring to FIG. 3, a second embodiment of the present invention may be seen. As may be seen, similar structures and features should be considered to have similar functions and limitations. A housing 212, preferably constructed of a ferromagnetic material such as iron, carries a solenoid 210. Coaxial to the central axis of the housing 212 is a pole piece 214, also preferably constructed of a ferromagnetic material. An annular cavity 216, located radially intermediate the housing 212 and the pole piece 214, retains a conductive coil 218, preferably constructed of copper, connected to an electric current source 219 via electrical contacts 215. When excited by an input electric current, the coil 218 induces a magnetic flux to flow substantially along a magnetic circuit defined by the housing 212, the pole piece 214 and at least a portion of an armature 220. The pole piece 214 extending beyond the coil 218 forms a flange 222 at the interior end. A flange 222 forms a flange face 223 on the surface closest to the armature 220. The flange 222 retains the coil 218 and forms one surface of the radial working air gap GG.

The opposite end 211 of the pole piece 214 is threaded and extends into a threaded aperture 217 of an end disc 213 so as to retain the solenoid 210 as a single unit. The threaded end 211 is further provided with means to apply torque, such that rotation of the pole piece 214 within the aperture 215 cause axial motion of the pole piece 214 and the face 223 within the solenoid 210 to vary an initial axial working gap FF.

A cylindrical cavity 224 extends through the axis of the pole piece 214 allowing access to a stop set screw 226 and a seat set screw 221 from the exterior of the solenoid 210. A tapped portion of the cylindrical cavity 224 forms a threaded cylindrical channel. The stop set screw 226 threadingly mates with a cavity 225 formed in the seat set screw 221. The stop set screw 226 can be rotated within the cavity 225 to cause longitudinal displacement of the stop set screw 226 against one end of an armature stem 227 to limit rightward armature 220 motion. The seat set screw 221 is provided with mating threads to the cavity 224 and can be rotated within the cavity 224 to cause longitudinal displacement of the seat set screw 221 within the cylindrical cavity 224 and displacement of the spring seat 228 within the cylindrical cavity 224. The solenoid spring seat 228 may thus be selectively positioned along the center longitudinal axis of the solenoid 210 to modify the solenoid output force-input current relationship.

The solenoid spring seat 228 reacts to the first spring force exerted by the solenoid spring 230 on the armature stem 227. The stem 227 has a plurality of low friction guides 229 forming annular ridges along the longitudinal length of the stem 227 with an outer diameter nearly equal to the inner diameter of the cavity 224. The spring 230 is initially compressed upon installation and remains compressed thereafter. The initial return spring 230 compression may adjusted by the seat set screw 221 as noted above.

Armature 220 has a circular face 240 separated from the flange face 223 by an axial air gap FF. An outer face 241 is located opposite the face 240. An annular ring or rim 242 circumferentially encompasses the outer periphery of the armature 220 and extends longitudinally beyond both the circular face 240 and the outer face 241 to form lips 243, 245. The inner circumferential surface of the lip 243 defines an armature radial working gap surface 244. The gap surface area 244 and a cooperating pole piece radial working gap surface 248 on the outer circumference of the flange 222 define a radial working gap GG. In the configurations evaluated to date, a radial working gap GG of approximately 0.015 inches has been found preferable. However, other configurations may indicate a larger or smaller radial working gap GG. An armature return gap surface 246 on the outer circumferential surface of the rim 242 likewise cooperates with a housing return gap surface 250 on the inner circumferential surface of the housing 212 to form a return gap RR. A return gap RR of approximately 0.015 inches has also been found preferable but may vary with design.

The armature 220 remains in an axial position through the low friction guides 229 located along the stem 227. A transfer pin 277 threadingly engages a tapped orifice 256 provided at the hub of the armature 220, the orifice 256 extending through a flat surface 260 of the armature 220 to the circular face 240.

As seen in FIG. 3, a control valve assembly 270 includes the solenoid 210 and a valve assembly 272 located within the housing member 279. The control valve assembly 270 includes one fluid inlet and two fluid outlets provide in the housing member 279. A fluid inlet port 278 is supplied with a system hydraulic fluid pressure exceeding 90 psig. Fluid entering the control valve assembly 270 flows through a restriction orifice 294 into a control chamber 280. A pair of controlled fluid outlet orifices 290 (having an inner diameter preferably about 0.118 in.) continuously communicate with the control chamber 280. A set of four bypass pressure outlets 292 (having an inner diameter preferably about 0.197 in.) continuously communicate with a bypass chamber 296. The control chamber 280 and the bypass chamber 296 are in selective communication via the valve assembly 272.

The valve assembly 272 includes a poppet valve 274 to selectively allow fluid flow through a control orifice 276 located within a valve seat 295. The poppet valve 274 is formed from a portion of the transfer pin 277. The poppet valve 274 also forms a circular face 282.

The valve assembly 272 remains in a position coaxial with the control valve assembly 270 due to a guidance member 283 fixedly retained between the housing 279 and the armature 220. The guidance member 283 is provided with an axial passage 281 to slidingly receive the transfer pin 277.

As noted in describing the first embodiment, the resultant force obtained from the several forces acting on the solenoid armature 220 selectively regulates the operation of the control valve assembly 270. The control valve assembly 270 also operates as a bypass valve, but at higher input pressures. Here, the minimum hydraulic fluid input pressure is about 90 psig. Restriction orifice 294 acts to retard large flow rates, with a preferable inner diameter of about 0.030 in., yet communicates a pressure signal at relatively low flow rates into the control chamber 280. The inlet pressure within the control chamber 280 exposed to the circular face 282 of the poppet valve 274 produces the second hydraulic force urging the face 282, the poppet valve 274, the transfer pin 277, and the armature 220 to the right against the return spring 230.

The return spring 230, in turn, produces the first spring force seeking to push the armature 220 toward the left. When the inlet pressure is 90 psig or less, the second hydraulic force is less than the first spring force and the face 282, the poppet valve 274, the transfer pin 277, and the armature 220 remain stationary in the position shown in FIG. 3. The valve assembly 272 thus remains closed as the second hydraulic force is insufficient to move the poppet valve 274 away from the valve seat 295. The control chamber 280 pressure signal flows only through the controlled outlet orifice 290 to the hydraulically actuated device, such as a hydraulic clutch pack.

When the inlet pressure exceeds 90 psig, the second hydraulic force exceeds the first spring force and the face 282, the poppet valve 274, the transfer pin 277, and the armature 220 move slightly to the right. The valve assembly 272 thus opens slightly as the second hydraulic force moves the poppet valve 274 away from the valve seat 295. The pressure signal into the control chamber 280 thus allows flow into the bypass chamber 296 and through the bypass pressure outlets 292 to a low pressure return circuit as well as through the controlled outlet orifices 290 to the hydraulically actuated device. The relatively low flow resistance of the bypass pressure outlets 292 encourages fluid to bleed through the valve assembly 272 until the pressure in the control chamber 280 is returns to 90 psig. Accordingly, a regulated maximum pressure can be constantly provided to the hydraulically actuated device regardless of the magnitude of an input pressure above 90 psig.

As previously noted, the third electromagnetic force arises from the magnetic flux flowing through the solenoid 210 and the armature 220, allowing operation of the valve assembly 272 as a variable orifice to regulate the controlled outlet pressure selectively between the maximum regulated pressure and very low pressures. When the controlled output pressure delivered by the controlled output orifices 290 is to be decreased (e.g., to decrease the pressure delivered to the hydraulically actuated device), an input current is applied to the coil 218. The input current, proportional to the desired decrease in the controlled output pressure, induces a magnetic flux of a fixed magnitude along the magnetic circuit created by the pole piece 214, the housing 212, the armature 220, the radial working gap GG and the return gap RR.

The resulting constant third electromagnetic force displaces the armature 220 to the right until the compression of the return spring 230, generating the first spring force, increases and is equal to the sum of the third electromagnetic force and the existing second hydraulic force. Thus, the face 282, the poppet valve 274, and the transfer pin 277, as well as the armature 220, are displaced to right. This opens the valve assembly 272 and allows flow to preferentially bleed through the bypass chamber 296 and the bypass pressure outlets 292 to the low pressure return circuit. The pressure signal through the controlled outlet orifices 290 to the hydraulically actuated device can thus be reduced to a very low minimum valve (e.g., 2-3 psig). As before, a lower minimum pressure in the control chamber 280 tends to induce hysteresis effects as the input current is reduced to zero. Thus, an increase or decrease of the input current accordingly varies the position of the armature 220 and the attached valve assembly 272 to control the controlled output pressure.

As the solenoid 210 has functional characteristics identical to the solenoid 10 described above, the improvements in the armature configuration and the corresponding gap behavior will not be repeated. Of particular note, however, is the reduction here in the axial length of the lip forming a surface of the radial working gap GG. To beneficially employ the presence of the radial working gap FF, the area of the radial working gap GG is reduced to induce magnetic saturation of the ferromagnetic elements at a lower input current. The overall operation of the solenoid 210 is not changed, and those skilled in the art will recognize this modification as an aspect of the overall calibration of the solenoid 210.

The solenoid according to the present invention thus has a substantially flat third force-stroke curve and a reasonably linear third electromagnetic force versus current characteristic. The design minimizes size and cost while allowing reasonable manufacturing tolerances for use in a flow control device.

The description and disclosure above were intended only the reveal the invention herein claimed without limitation of the invention to the specific embodiments referred to above. It should be noted that the invention herein disclosed may be advantageously practiced by other means without departing from the scope and spirit of the expressed device.

What is claimed is:

1. An electromechanical device, comprising:
    a housing;
    a magnetic coil arranged within said housing, said coil including an electrical winding;
    a pole piece having an axial length partially disposed within said coil in said housing, said pole piece having a first end extending beyond said electrical winding of said coil;
    a magnetic armature disposed within said housing, said armature having a center portion, an intermediate portion, and an outside portion,
    said armature outside portion being connected to said armature center portion by said armature intermediate portion,
    said armature outside portion having an axial length and being positioned radially outside said first end of said pole piece to define a first radial variable working air gap between said armature outside portion and said pole piece,
    said armature intermediate portion defining a substantially circular planar surface, said armature intermediate portion being axially displaceable from said first end of said pole piece to define an axial variable working air gap;
    said armature outside portion having an outer circumferential surface positioned radially inside and spaced from said housing to define a second radial working air gap;
    a seat member disposed within said pole piece;
    spring means positioned between said seat member and said armature center portion, said spring means adapted to urge said armature away from said seat member; and
    said housing, armature and pole piece forming a magnetic flux circuit such that energization of said magnetic coil being effective to cause translation of said armature toward said first end of said pole piece, axial movement of said armature outside portion during translation of said armature being effective to vary the portion of the axial length of said outside portion within the flux path and thereby vary the axial length of said first radial variable working air gap.

2. The electromechanical device of claim 1 wherein said armature includes centering means for preventing substantial radial movement of said armature within said housing, said centering means being operatively attached to said armature.

3. The electromechanical device of claim 2 wherein said centering means includes a diaphragm spring extending radially from said armature and being secured to said housing.

4. The electromechanical device of claim 2 wherein said centering means includes an armature stem member disposed within the center of said pole piece.

5. The electromechanical device of claim 1 wherein said seat member is disposed within said axial length of said pole piece within said electrical winding, said seat member being an axially translatable member threaded within said pole piece.

6. The electromechanical device of claim 1 wherein said first end of said pole piece includes a flange portion extending radially toward said armature outside portion.

7. The electromechanical device of claim 6 wherein said flange portion defines a radial length, said armature outside portion defining a radial width, said flange radial length being substantially greater than said armature outside portion radial width.

8. The electromechanical device of claim 6 wherein said armature outside portion extends axially in two directions beyond said armature intermediate portion.

9. The device of claim 8 wherein said armature center portion defines a cylindrical recess, said cylindrical recess being formed to receive said spring means.

10. A electromechanical flow control device, comprising:
    a housing;
    a magnetic coil arranged within said housing, said coil including an electrical winding;
    a pole piece having an axial length disposed within said coil in said housing, said pole piece having a first end extending beyond said electrical winding of said coil;
    a magnetic armature disposed within said housing, said armature having a center portion, an intermediate portion, and an outside portion,
    said armature outside portion being connected to said armature center portion by said armature intermediate portion, said armature outside portion having an axial length and being positioned radially outside said first end of said pole piece to define a first radial variable working air gap between said armature outside portion and said pole piece, said armature intermediate portion defining a substantially circular planar surface, said armature intermediate portion being axially displaceable from said first end of said pole piece to define an axial variable working air gap;

said armature outside portion having an outer circumferential surface positioned radially inside and spaced from said housing to define a second radial working air gap;

a seat member disposed within said pole piece;

spring means positioned between said seat member and said armature center portion, said spring means adapted to urge said armature away from said seat member; and, valve means operatively connected to said armature, said valve means including a fluid inlet, a fluid outlet, and a fluid conduit in operative communication with said fluid inlet and said fluid outlet to selectively allow fluid flow between said fluid inlet and said fluid outlet;

said housing, armature and pole piece forming a magnetic flux circuit such that energization of said magnetic coil being effective to cause translation of said armature toward said first end of said pole piece, axial movement of said armature outside portion during translation of said armature being effective to vary the portion of the axial length of said outside portion within the flux path and thereby vary the axial length of said first radial variable working air gap, said armature translation being effective to permit said fluid flow from said fluid flow inlet to said fluid outlet.

* * * * *